United States Patent
Schuler et al.

(10) Patent No.: US 8,135,765 B2
(45) Date of Patent: Mar. 13, 2012

(54) SYSTEM AND METHOD FOR A GENETIC INTEGRATION OF A DATABASE INTO A HIGH AVAILABILITY CLUSTER

(75) Inventors: Klaus Schuler, Darmstadt (DE); Markus Greiner, Ober-Ramstadt (DE)

(73) Assignee: Software AG, Darmstadt (DE)

( * ) Notice: Subject to any disclaimer, the term of this patent is extended or adjusted under 35 U.S.C. 154(b) by 538 days.

(21) Appl. No.: 12/136,247

(22) Filed: Jun. 10, 2008

(65) Prior Publication Data
US 2009/0307246 A1    Dec. 10, 2009

(30) Foreign Application Priority Data
Jun. 4, 2008  (EP) .................................. 08010216

(51) Int. Cl. *G06F 17/30* (2006.01)
(52) U.S. Cl. .. 707/829; 707/778; 707/956; 707/999.101
(58) Field of Classification Search ................ 714/4, 16; 709/226, 249; 707/778, 829, 956, 999.101
See application file for complete search history.

(56) References Cited

U.S. PATENT DOCUMENTS

| | | | | |
|---|---|---|---|---|
| 7,506,073 B2 * | 3/2009 | Kuik et al. | ..................... | 709/249 |
| 7,760,626 B2 * | 7/2010 | Malpani et al. | ............... | 370/230 |
| 7,992,039 B2 * | 8/2011 | Belyakov et al. | ................ | 714/16 |
| 2003/0055624 A1 | 3/2003 | Fletcher et al. | | |
| 2005/0038800 A1 | 2/2005 | Chidambaran et al. | | |
| 2006/0248371 A1 * | 11/2006 | Chen et al. | ......................... | 714/4 |
| 2006/0265529 A1 * | 11/2006 | Kuik et al. | ....................... | 710/62 |
| 2008/0256241 A1 * | 10/2008 | Graser et al. | .................. | 709/226 |

FOREIGN PATENT DOCUMENTS
EP    1510918    3/2005

OTHER PUBLICATIONS
European Search Report for application No. EP 08010216, mailed Sep. 16, 2008.

* cited by examiner

*Primary Examiner* — Jean M Corrielus
(74) *Attorney, Agent, or Firm* — Meyertons Hood Kivlin Kowert & Goetzel, P.C.; Jeffrey C. Hood; Joel L. Stevens

(57) ABSTRACT

An interface unit adapted for connecting at least one database to at least one of a plurality of high availability cluster servers (HA cluster servers), wherein each database is adapted to execute a set of database-specific commands and wherein each HA cluster server is adapted to output a set of HA cluster server-specific commands. The interface unit may comprise a first interface layer adapted for receiving each of the set of HA cluster server-specific commands outputted by the HA cluster servers; and a second interface layer adapted for sending each of the set of database-specific commands to the respective databases. The interface unit may be further adapted to map each of the HA cluster server-specific commands to at least one of the database-specific commands.

14 Claims, 4 Drawing Sheets

Fig. 2

Figure 1:
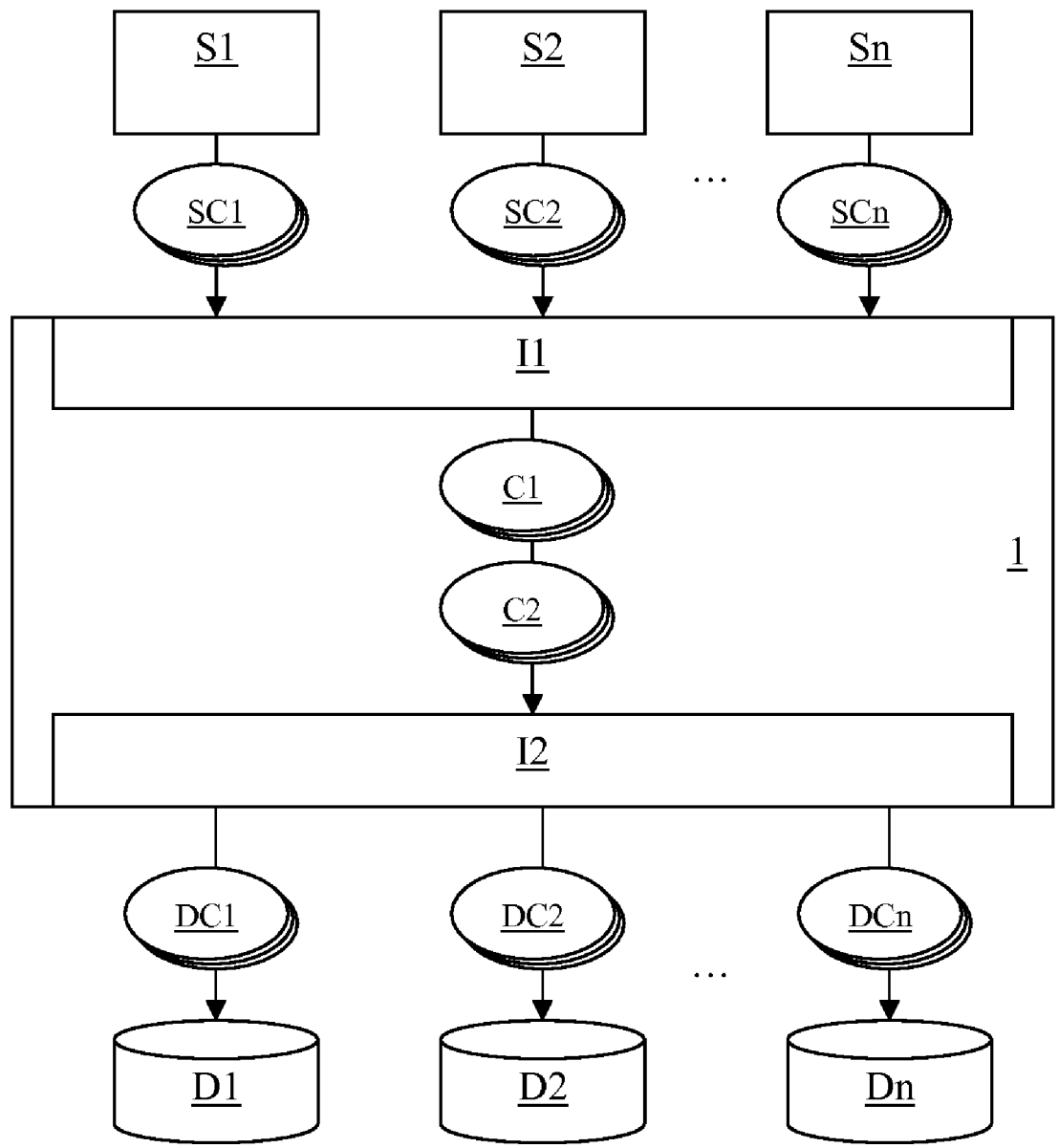

| SC1 |
|---|
| online SC11 |
| offline SC12 |
| monitor SC13 |
| cleanup SC14 |

| SC2 |
|---|
| online SC21 |
| offline SC22 |
| monitor SC23 |
| cleanup SC24 |

...

| SCn |
|---|
| online SCn1 |
| offline SCn2 |
| monitor SCn3 |
| cleanup SCn4 |

| C1 |
|---|
| online C11 |
| offline C12 |
| monitor C13 |
| cleanup C14 |

| C2 |
|---|
| start C21 |
| stop C22 |
| monitor C23 |
| update C24 |
| abort C25 |
| terminate C26 |
| cleanup C27 |

| DC1 |
|---|
| start DC11 |
| stop DC12 |
| update DC14 |
| abort DC15 |
| terminate DC16 |
| cleanup DC17 |

| DC2 |
|---|
| start DC21 |
| stop DC22 |
| update DC24 |
| abort DC25 |
| terminate DC26 |
| cleanup DC27 |

...

| DCn |
|---|
| start DCn1 |
| stop DCn2 |
| update DCn4 |
| abort DCn5 |
| terminate DCn6 |
| cleanup DCn7 |

SYSTEM AND METHOD FOR A GENETIC INTEGRATION OF A DATABASE INTO A HIGH AVAILABILITY CLUSTER

PRIORITY CLAIM

This application claims benefit of priority of European application no. 08 010 216.3 titled "System and Method for a Genetic Integration of a Database into a High Availability Cluster", filed Jun. 4, 2008, and whose inventors are Klaus Schuler and Markus Greiner.

INCORPORATED BY REFERENCE

European application no. 08 010 216.3 titled "System and Method for a Genetic Integration of a Database into a High Availability Cluster", filed Jun. 4, 2008, and whose inventors are Klaus Schuler and Markus Greiner, is hereby incorporated by reference in its entirety as though fully and completely set forth herein.

TECHNICAL FIELD

The present invention relates to a system and method for a generic integration of a database into a high availability cluster.

DESCRIPTION OF THE RELATED ART

A high availability cluster is a server setup serving the purpose of improving the availability of a certain service to client applications in a network. Mission-critical services, e.g. a database service, must be available to client applications 24 hours a day, 7 days a week, 52 weeks per year. This class of availability is called "high availability" and is usually achieved by providing redundant servers (called nodes) in the cluster each server hosting a clone of the service.

Normally, if a server providing a certain service fails, e.g. due to a hardware crash, the service will be unavailable to client applications until maintenance personnel fixes the crashed server. A high availability cluster remedies this situation by providing redundancy, so that usually one node is active and serves the client applications and the other nodes are in standby. Furthermore, a high availability cluster usually comprises a software application called "high availability cluster server" (HA cluster server), which continuously monitors the health of hardware and software of the active node. In case of a hardware or software failure on the active node, the HA cluster server immediately disables the active node and sets one of the standby nodes active without administrative intervention. Thus, the HA cluster server allows for continuous availability of the service.

The described setup not only applies to databases, but is commonly used for all kinds of mission-critical services, such as file servers or web servers for electronic commerce websites.

In order to integrate a service into a high availability cluster, the HA cluster server typically provides a plugin-framework comprising commands which the HA cluster server uses for monitoring and controlling the service. The service developer has to implement a plugin for this framework such that the hardware or software hosting the service can become part of the monitoring of the HA cluster server.

As the implementation of a HA cluster server is highly difficult and complex, the enterprises intending to make their services highly available usually obtain HA cluster server products from specialized providers of such products. Currently, there are a number of HA cluster server products available. Each one however provides a different technical framework for the service integration. Hence, in order to integrate a database into n HA cluster server products, n different plugins need to be implemented, one for each HA cluster server product. It is apparent that this manual implementation of the plugins requires substantial development effort and involves the risk of introducing errors into the system. Furthermore, if all the plugins of the HA cluster servers have been implemented in order to integrate a specific database product into all available high availability cluster servers, the HA cluster servers are tightly coupled to this specific database product. It is common for complex services to be sometimes migrated onto another database product, e.g. a new version of the database providing better performance or a database product of a competing provider. In this case, all the manually implemented plugins are useless, since the new database product possibly requires a different set of commands. Hence, all the plugins have to be implemented again for the new database product, which is inefficient and inflexible.

The WO 03/010678 discloses a system and method for providing high availability in file server systems. It describes the use of two or more hardware nodes and means to switch between nodes in case of a failure of one node. The system further comprises means of load-balancing by migrating virtual servers from heavily loaded nodes to less heavily loaded nodes. However, The WO 03/010678 does not mention how to overcome the specific difficulties when faced with the task of integrating a database into a high availability system.

In view of the above, it is therefore the technical problem underlying the present invention to provide a system and method which allows a flexible, efficient and error-free integration of a database into an available HA cluster server product which at least partly overcomes the above explained disadvantages of the prior art.

SUMMARY OF THE INVENTION

Various embodiments of the invention relate to an interface unit for connecting at least one database to at least one of a plurality of high availability cluster servers (HA cluster servers). Each database is adapted to execute a set of database-specific commands and each HA cluster server is adapted to output a set of HA cluster server-specific commands. In one embodiment, the interface unit comprises:

a. a first interface layer adapted for receiving each of the set of HA cluster server-specific commands outputted by the HA cluster servers; and b. a second interface layer adapted for sending each of the set of database-specific commands to the respective databases, wherein c. the interface unit is further adapted to map each of the HA cluster server-specific commands to at least one of the database-specific commands.

Accordingly, one embodiment defines two interface layers which allow a seamless integration of a database into an available HA cluster server. The first interface layer is adapted for being compatible to at least one of the different HA cluster servers, i.e. being able to receive the sets of HA cluster server-specific commands. The second interface layer is adapted for being compatible to at least one of the different database products, i.e. being able to call the sets of database-specific commands of the databases to be connected to the HA cluster. The interface unit is further adapted so that a call of a HA cluster server-specific command received by the first interface layer may result in at least one call of a database-specific command.

In one aspect of the invention, the interface unit further comprises a set of HA cluster server-independent commands, which is preferably a HA cluster server-neutral representation of the different HA cluster server-specific sets of commands. When the interface unit receives a HA cluster server-specific command, it maps this HA cluster server-specific command onto the corresponding HA cluster server-independent command. This has the effect that any further processing of the command inside the interface unit is completely independent of the specific command format of the HA cluster servers. The exact format of the HA cluster server-independent commands is described in the detailed description of the invention.

In another aspect of the invention, the interface unit further comprises a set of database-independent commands, which is preferably a database-neutral representation of the different database-specific sets of commands of the different databases to be connected to the HA cluster. Each of the database-independent commands is mapped to all of the corresponding different database-specific commands. This has the effect that the internal processing of the commands inside the interface unit is completely independent of the specific database product. The exact format of the database-independent commands is described in the detailed description of the invention.

In yet another aspect of the invention, the interface unit is further adapted for mapping the HA cluster server-independent commands onto the database-independent commands. This is a 1-to-n-mapping, i.e. one command in the HA cluster server-independent representation may be translated into one or more commands in the database-independent representation. Examples of such translations can be found in the detailed description of the invention.

According to a further aspect of the invention, the interface unit guarantees that a response to one of the HA cluster server-specific commands is provided in a predetermined amount of time. This is a requirement raised by the HA cluster servers in order to ensure the high availability of the system as a whole. This is achieved in that all of the HA cluster server-independent commands are implemented in a way that each of those commands may call a special command which terminates the further processing and sends a corresponding return value to the HA cluster server. This special command call is a last resort if one or more of the database-independent command do not respond in a predefined amount of time.

According to a further aspect of the present invention, a method is provided for connecting at least one database to at least one of a plurality of high availability cluster servers (HA cluster servers), wherein each database is adapted to execute a set of database-specific commands and wherein each HA cluster server is adapted to output a set of HA cluster server-specific commands, the method comprising the steps of:
a. receiving each of the set of HA cluster server-specific commands outputted by the HA cluster servers at a first interface layer; and
b. sending each of the set of database-specific commands to the respective databases from a second interface layer; wherein
c. each of the HA cluster server-specific commands is mapped to at least one of the database-specific commands.

Further advantageous modifications of embodiments of the interface unit and the method of the invention are defined in further dependent claims.

SHORT DESCRIPTION OF THE DRAWINGS

Figure 3:
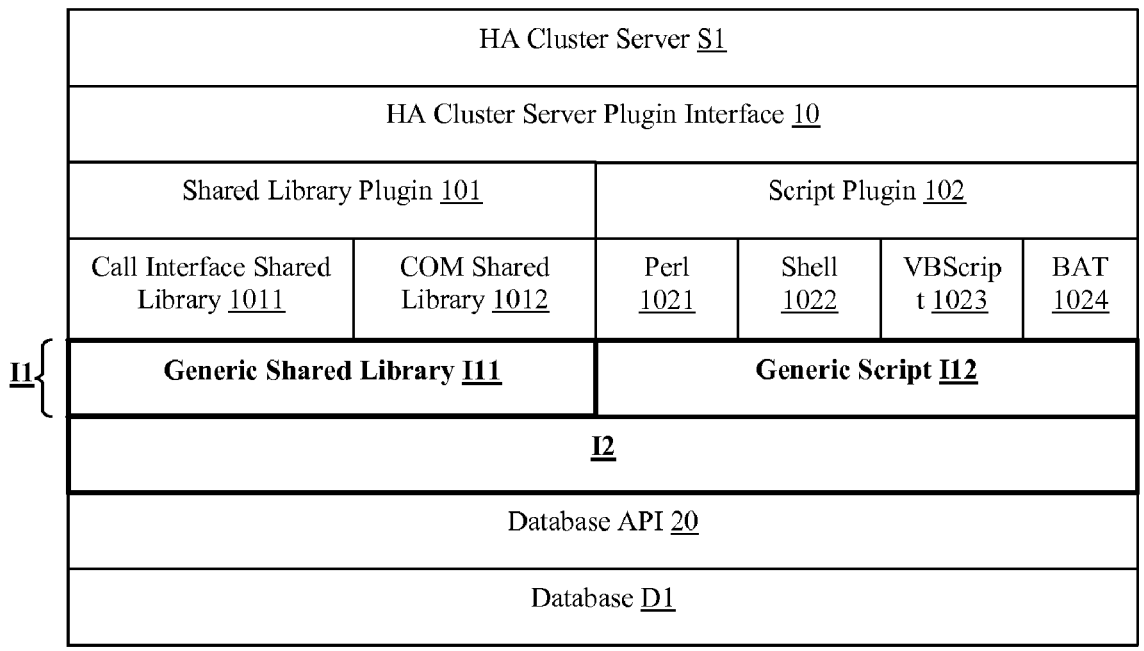
Figure 4:
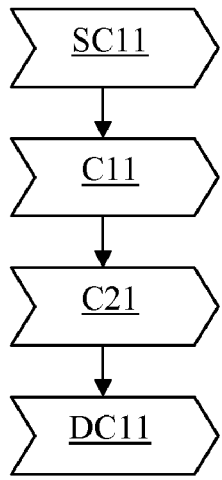
Figure 5:
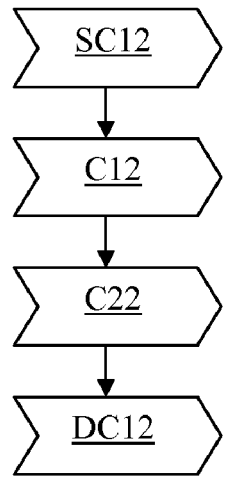
Figure 6:
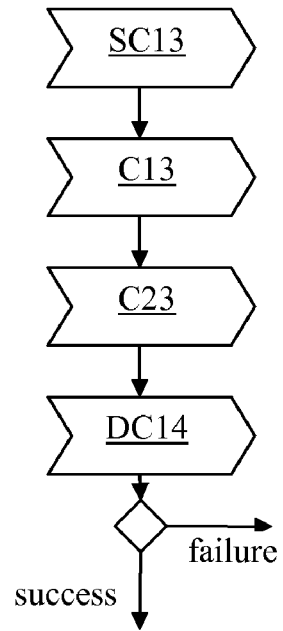
Figure 7:
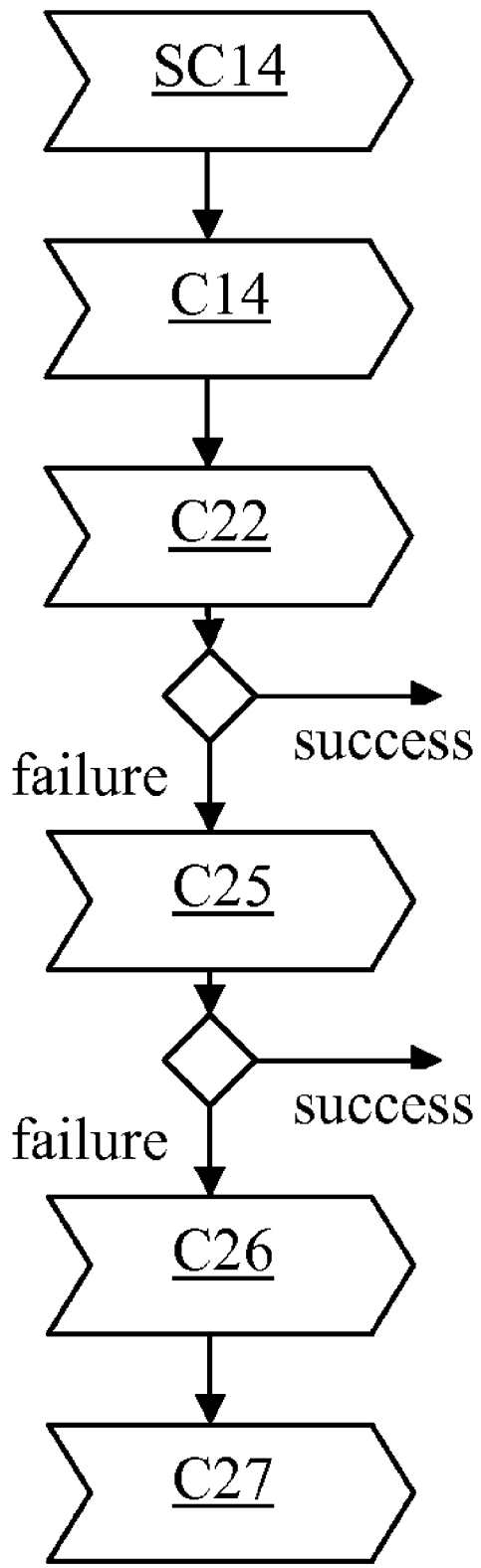

In the following detailed description, presently preferred embodiments of the invention are further described with reference to the following figures:

FIG. 1: An overview of the main parts of an embodiment of an interface unit in accordance with the present invention;

FIG. 2: An overview of the different sets of commands provided by the parts of an embodiment of an interface unit in accordance with the present invention and its surrounding systems;

FIG. 3: A detailed schematic view of the interface hierarchy of an embodiment of an interface unit in accordance with the present invention and its surrounding systems;

FIG. 4: A flow diagram of the task of setting the database active by the HA cluster server;

FIG. 5: A flow diagram of the task of shutting the database down in an ordered manner by the HA cluster server;

FIG. 6: A flow diagram of the task of monitoring the database by the HA cluster server;

FIG. 7: A flow diagram of the task of cleaning up the database by the HA cluster server.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

In the following, a presently preferred embodiment of the invention is described with respect to an interface unit 1 as schematically shown in FIG. 1. As can be seen, the interface unit 1 comprises two interface layers I1 and I2 for connecting at least one of a plurality of HA cluster servers S1, S2, . . . , Sn to at least one database D1, D2, . . . , Sn. As each of the HA cluster servers S1, S2, . . . , Sn sends commands of a set of HA cluster server-specific commands SC1, SC2, . . . , Sn, the interface unit 1 is adapted for being able to receive commands in at least one of those HA cluster server-specific formats. This is achieved in that the first interface layer I1 comprises implementations of at least one of the plugin-frameworks of the HA cluster servers S1, S2, . . . , Sn. Furthermore, as each of the databases D1, D2, . . . , Dn can receive commands of a set of database-specific commands DC1, DC2, . . . , DCn, the interface unit 1 is further adapted for being able to send commands in at least one of those database-specific formats from the interface layer I2.

The interface unit 1 further comprises two internal sets of commands. A set of HA cluster server-independent commands C1 and a set of database-independent commands C2, which are described in the following.

The set of HA cluster server-independent commands C1 comprises HA cluster server-neutral representations of all the commands of the respective sets of HA cluster server-specific commands SC1, SC2, . . . , SCn, i.e. abstracting from the different specific formats the HA cluster servers S1, S2, . . . , Sn define. When the interface unit 1 receives a HA cluster server-specific command SC11, SC14, . . . , SCn1, . . . , SCn4 (see FIG. 2) through one of its implementations of the respective plugin, it maps it onto the corresponding HA cluster server-independent command C11, . . . , C14. This has the effect that any further processing of the command inside the interface unit 1 is completely independent of the specific command format of the HA cluster servers S1, S2, . . . , Sn. The set of HA cluster server-independent commands C1 comprises at least one of the following commands (see FIG. 2):

online C11: sets the database (D1, D2, ..., Dn) active in a predetermined amount of time offline C12: shuts down the database (D1, D2, ..., Dn) in an ordered manner in a predetermined amount of time monitor C13: monitors the health of the database (D1, D2, ..., Dn). This command returns a value in a predetermined amount of time indicating whether the database (D1, D2, ..., Dn) is active or inactive cleanup C14: shuts down the database (D1, D2, ..., Dn) in a predetermined amount of time no matter what the current status of the database (D1, D2, ..., Dn) is. This command is called whenever the HA cluster server S1, S2, ... detects an undefined status of the database (D1, D2, ..., Dn)

The set of database-independent commands C2 comprises database-neutral representations of all the database-specific commands DC11, ..., DC17, ..., DCn1, ..., DCn7 of the sets of database-specific commands DC1, DC2, ..., DCn, i.e. abstracting from the different specific formats the databases D1, D2, ..., Dn define. Each of the database-independent commands C21, ..., C27 is mapped to all of the corresponding different database-specific commands DC11, ..., DC17, ..., DCn1, ..., DCn7. This has the effect that the internal processing of the commands inside the interface unit 1 is completely independent of the specific database product D1, D2, ..., Dn. The set of database-independent commands C2 comprises at least one of the following commands (see FIG. 2):

start C21: starts the database (D1, D2, ..., Dn) in a predetermined amount of time stop C22: stops the database (D1, D2, ..., Dn) with rollback of transactions in a predetermined amount of time monitor C23: monitors the health of the database (D1, D2, ..., Dn) in a predetermined amount of time update C24: updates a timestamp in a defined location in the database (D1, D2, ..., Dn) in a predetermined amount of time abort C25: aborts the database (D1, D2, ..., Dn) without transaction handling in a predetermined amount of time terminate C26: terminates the database (D1, D2, ..., Dn) process in a predetermined amount of time cleanup C27: cleans up the allocated operating system resources of the database (D1, D2, ..., Dn). This command may remove persistent operating system resources used for inter-process communication FIG. 3 shows an example of the interface hierarchy between the HA cluster server S1, an embodiment of an interface unit 1 in accordance with the present invention and the database D1. It should be appreciated that FIG. 3 only shows the described interface hierarchy on the example of the HA cluster server S1 and the database D1, but that this structure also applies to any of the further HA cluster servers S2, ..., Sn and databases D2, ..., Dn.

As can be further seen in FIG. 3, a HA cluster server S1 provides a HA cluster server plugin interface 10 providing the set of HA cluster server-specific commands SC1 described above. There are numerous variations of implementations of this HA cluster server plugin interface 10. Some plugin-frameworks expect the implementation of a shared library plugin 101 with defined entry points, whereas some frameworks expect a scripting language interface of a script plugin 102 with defined entry points. The shared library plugin 101 solution in itself varies widely, e.g. the name of the entry points differ and the used interface may be a plain call interface shared library 1011 or an implementation of Microsoft's COM shared library 1012. The script plugin 102 solution in itself also varies widely, e.g. the supported scripting languages may be Perl 1021, Shell 1022, Visual Basic Script 1023 or Windows Command (BAT) 1024. It should be appreciated that a variety of further implementations of both the shared library plugin 101 and the script plugin 102 may exist, which are not depicted in FIG. 3.

The interface layer I1 described above can provide both a generic shared library I11 which implements e.g. the call interface shared library 1011 and/or the COM shared library 1012, as well as a generic script 112 which uses e.g. Perl 1021, Shell 1022, Visual Basic Script 1023 and/or Windows Command (BAT) 1024.

The interface layer I2 is configured so that it is able to communicate with a database API 20 which may provide the set of database-specific commands DC1 of the database D1, as already described above.

The exemplary embodiment of the present invention allows for the construction of various flows of control for the commands of the HA cluster servers S1, S2, ..., Sn. In the following, example control flows are described between the HA cluster server S1, an exemplary embodiment of the presented interface unit 1 and the database D1. It should be appreciated that equal control flows exist for each of the HA cluster servers S2, ..., Sn and each of the databases D2, ..., Dn.

FIG. 4 depicts a control flow for the task of setting the database D1 active by the HA cluster server S1. The task is initiated by the HA cluster server S1 calling the HA cluster server-specific command online SC11 of the set of HA cluster server-specific commands SC1, which is received at the interface layer I1 of the interface unit 1. This results in a call of the HA cluster server-independent command online C11 of the set of HA cluster server-independent commands C1, which itself calls the database-independent command start C21 of the set of database-independent commands C2. The interface layer I2 consequently sends the database-specific command start DC11 of the set of database-specific commands DC1 to the database D1.

FIG. 5 depicts a control flow for the task of shutting the database D1 down in an ordered manner by the HA cluster server S1. The task is initiated by the HA cluster server S1 calling the HA cluster server-specific command offline SC12 of the set of HA cluster server-specific commands SC1, which is received at the interface layer I1 of the interface unit 1. This results in a call of the HA cluster server-independent command offline C12 of the set of HA cluster server-independent commands C1, which itself calls the database-independent command stop C22 of the set of database-independent commands C2. The interface layer I2 consequently sends the database-specific command stop DC12 of the set of database-specific commands DC1 to the database D1.

FIG. 6 depicts a control flow for the task of monitoring the database D1 by the HA cluster server S1. The task is initiated by the HA cluster server S1 calling the HA cluster server-specific command monitor SC13 of the set of HA cluster server-specific commands SC1, which is received at the interface layer I1 of the interface unit 1. This results in a call of the HA cluster server-independent command monitor C13 of the set of HA cluster server-independent commands C1, which itself calls the database-independent command monitor C23 of the set of database-independent commands C2. The interface layer I2 consequently sends the database-specific command update DC14 of the set of database-specific commands DC1 to the database D1. The database-specific command update DC14 is used, since a database D1 usually does not provide a command for monitoring the database status. Therefore, a special dummy field in the database is updated.

According to the result of this update (success/failure), the availability of the database D1 is determined.

FIG. 7 depicts a control flow for the task of cleaning up the database D1 by the HA cluster server S1. The task is initiated by the HA cluster server S1 calling the HA cluster server-specific command cleanup SC14 of the set of HA cluster server-specific commands SC1, which is received at the interface layer I1 of the interface unit 1. This results in a call of the HA cluster server-independent command cleanup C14 of the set of HA cluster server-independent commands C1, which itself first calls the database-independent command stop C22 of the set of database-independent commands C2 in order to shut down the database with rollback of transactions. If this command fails, the database-independent command abort C25 of the set of database-specific commands C2 is called in order to shut down the database without transaction handling. If this command also fails, the database-independent command terminate C26 of the set of database-independent commands C2 is called in order to terminate the database process. Lastly, the database-independent command cleanup C27 is called in order to free the operating system resources still bound by the database.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A non-transitory computer accessible memory medium comprising program instructions adapted for connecting at least one database to at least one of a plurality of high availability cluster servers (HA cluster servers), wherein each database is adapted to execute a set of database-specific commands and wherein each HA cluster server is adapted to output a set of HA cluster server-specific commands, wherein the program instructions are executable to implement:
   a. a first interface layer adapted for receiving each of the set of HA cluster server-specific commands outputted by the HA cluster servers; and
   b. a second interface layer adapted to communicate with the first interface layer and which is adapted for sending each of the set of database-specific commands to the respective databases, wherein the second interface layer is different from the first interface layer;
   c. wherein the program instructions are further executable to map each of the HA cluster server-specific commands to at least one of the database-specific commands.

2. The non-transitory computer accessible memory medium of claim 1, wherein the program instructions are further executable to respond to one of the HA cluster server-specific commands even when the at least one database does not respond to the at least one database-specific command in a predetermined amount of time.

3. The non-transitory computer accessible memory medium of claim 1, wherein the program instructions are further executable to implement a set of HA cluster server-independent commands, wherein the interface unit is adapted for mapping each of the set of HA cluster server-specific commands onto the set of HA cluster server-independent commands.

4. The non-transitory computer accessible memory medium of claim 3, wherein the set of HA cluster server-independent commands comprises at least one of the group of commands comprising: setting the database active, shutting down the database in an ordered manner, monitoring the health of the database and/or shutting down the database independent of whether the database is currently active or inactive.

5. The non-transitory computer accessible memory medium of claim 1, wherein the program instructions are further executable to implement a set of database-independent commands, wherein the interface unit is adapted for mapping the set of database-independent commands onto each of the set of database-specific commands.

6. The non-transitory computer accessible memory medium of claim 5, wherein the set of database-independent commands comprises at least one of the group of commands comprising: starting the database, stopping the database with rollback of transactions, monitoring the health of the database, updating a timestamp in a defined location of the database, aborting the database, terminating the database and/or cleaning up the operating system resources used by the database.

7. The non-transitory computer accessible memory medium of claim 1,
   wherein the program instructions are further executable to implement a set of HA cluster server-independent commands, wherein the interface unit is adapted for mapping each of the set of HA cluster server-specific commands onto the set of HA cluster server-independent commands;
   wherein the program instructions are further executable to implement a set of database-independent commands, wherein the interface unit is adapted for mapping the set of database-independent commands onto each of the set of database-specific commands; and
   wherein the program instructions are further executable to map the set of HA cluster server-independent commands onto the set of database-independent commands, wherein a HA cluster server-independent command calls at least one database-independent command.

8. The non-transitory computer accessible memory medium of claim 1, wherein the first interface layer is further adapted for implementing a shared library provided by at least one of the plurality of HA cluster servers.

9. The non-transitory computer accessible memory medium of claim 1, wherein the first interface layer is further adapted for using a scripting language provided by at least one of the plurality of HA cluster servers.

10. A method for connecting at least one database to at least one of a plurality of high availability cluster servers (HA cluster servers), wherein each database is adapted to execute a set of database-specific commands, and wherein each HA cluster server is adapted to output a set of HA cluster server-specific commands, the method comprising:
    a. receiving each of the set of HA cluster server-specific commands outputted by the HA cluster servers at a first interface layer; and
    b. sending each of the set of database-specific commands to the respective databases from a second interface layer, wherein the second layer is different from the first interface layer and adapted to communicate with the first interface layer;
    c. wherein each of the HA cluster server-specific commands is mapped to at least one of the database-specific commands.

11. The method of claim 10, further comprising responding to one of the HA cluster server-specific commands even when the at least one database does not respond to the at least one database-specific command in a predetermined amount of time.

12. The method of claim 10, further comprising mapping each of the set of HA cluster server-specific commands onto a set of HA cluster server-independent commands.

13. The method of claim 10, further comprising mapping a set of database-independent commands onto each of the set of database-specific commands.

14. The method of claim 10, further comprising:
mapping each of the set of HA cluster server-specific commands onto a set of HA cluster server-independent commands;

mapping a set of database-independent commands onto each of the set of database-specific commands; and mapping the set of HA cluster server-independent commands onto the set of database-independent commands, wherein a HA cluster server-independent command calls at least one database-independent command.

* * * * *